(12) United States Patent
Benninger

(10) Patent No.: US 6,929,711 B2
(45) Date of Patent: Aug. 16, 2005

(54) METHOD OF MAKING AN INTERIOR TRIM PART

(75) Inventor: Eric J. Benninger, Livonia, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/426,362

(22) Filed: Apr. 29, 2003

(65) Prior Publication Data

US 2004/0217523 A1 Nov. 4, 2004

(51) Int. Cl.7 .............................. B32B 5/18; B32B 1/10
(52) U.S. Cl. ...................... 156/212; 156/214; 156/228; 156/245; 156/285; 156/288; 264/46.5; 264/320; 264/553
(58) Field of Search ................................. 156/212, 214, 156/228, 245, 285, 288; 264/465, 468, 320, 321, 324, 510, 553, 554, 521, 46.1, 46.2, 46.3, 46.4, 46.5, 46.8, 257, 258

(56) References Cited

U.S. PATENT DOCUMENTS

| | | | |
|---|---|---|---|
| 4,766,025 A | 8/1988 | Sanok et al. | |
| 5,387,390 A | 2/1995 | Kornylo | |
| 5,397,409 A | 3/1995 | Kornylo | |
| 5,571,355 A | 11/1996 | Kornylo | |
| 5,718,791 A | * 2/1998 | Spengler | ...................... 156/212 |
| 5,989,699 A | 11/1999 | Kuczynski et al. | |
| 6,319,438 B1 | 11/2001 | Smith et al. | |
| 6,389,768 B1 | 5/2002 | Gagne et al. | |
| 2002/0009594 A1 | 1/2002 | Smith et al. | |

* cited by examiner

Primary Examiner—Sue A. Purvis
(74) Attorney, Agent, or Firm—Brooks Kushman P.C.

(57) ABSTRACT

A method of making a vehicle interior trim part includes forming an air-permeable substrate into a desired shape; positioning the formed substrate and a cover material on a vacuum mold such that the substrate extends between the cover material and the mold; and vacuum forming the cover material over the substrate.

14 Claims, 2 Drawing Sheets

METHOD OF MAKING AN INTERIOR TRIM PART

BACKGROUND OF THE INVENTION

1. Field of the Invention

The invention relates to a method of making a vehicle interior trim part.

2. Background Art

A prior method of making a vehicle interior trim component or part, such as a door panel, involves molding an air-impermeable polypropylene substrate, and then drilling holes through the substrate so that air can be drawn through the substrate. Alternatively, discrete holes may be molded into the substrate during the molding step. The method further includes positioning the substrate and a heated cover material over a vacuum mold such that the substrate is disposed between the cover material and the mold. An adhesive film may also be positioned between the substrate and the cover material. Next, air is drawn through the holes in the substrate to vacuum form the cover material to the substrate.

Because air is not able to pass through the substrate at locations where no holes have been formed, this method may result in air bubbles being trapped between the cover material and the substrate. Furthermore, subsequent to the vacuum forming step, an additional procedure may be required to wrap the cover material around peripheral edges of the substrate, if desired. Such a procedure adds significant cost to the method.

SUMMARY OF THE INVENTION

Under the invention, a method of making a vehicle interior trim part includes forming an air-permeable substrate into a desired shape; positioning the formed substrate and a cover material on a vacuum mold such that the substrate extends between the cover material and the mold; and vacuum forming the cover material over the substrate.

DETAILED DESCRIPTION OF THE PREFERRED EMBODIMENT(S)

Figure 1:
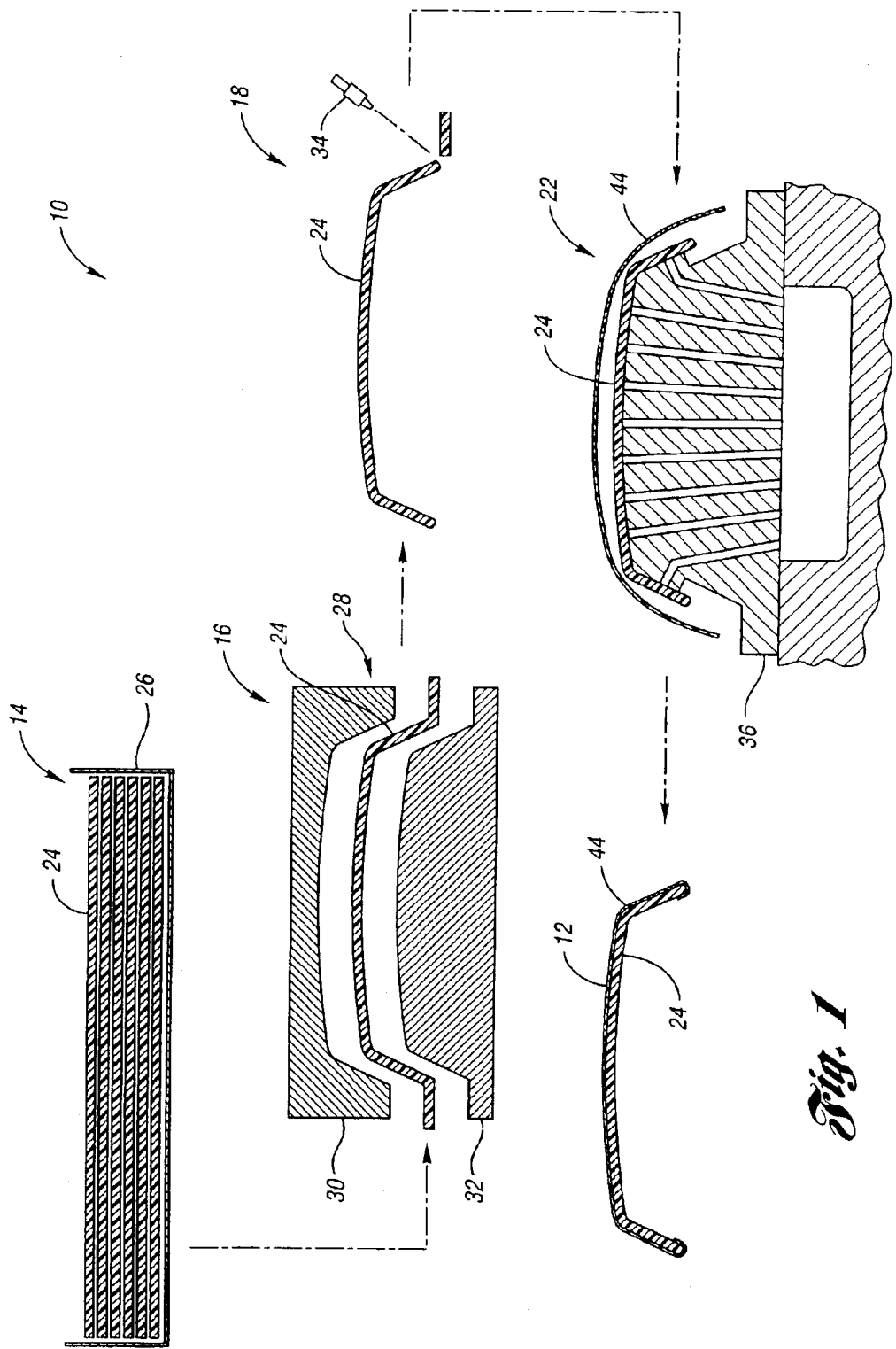
FIG. 1 is a schematic view of a system or arrangement for manufacturing a vehicle interior trim part according to the invention, the arrangement including a vacuum mold that is shown prior to activation.

FIG. 1 shows a system or arrangement 10 for manufacturing a vehicle interior trim part 12, such as a door panel, package shelf, headliner, trunk panel, console panel, instrument panel, or any other suitable interior trim part. The arrangement 10 includes a component storage area 14, a forming station 16, a trimming station 18 and a cover application station 22. The arrangement 10 may further include a conveyor system (not shown) that may include one or more conveyors, such as belt conveyors, for transporting components between two or more of the stations 14–22.

A method according to the invention of manufacturing the interior trim part 12 using the production line arrangement 10, for example, will now be described in detail. First, a main body or substrate, such as a blank 24, is selected from the component storage area 14, which includes a source 26 of blanks 24. The blank 24 may comprise any suitable porous, air-permeable material and may be formed in any suitable manner. For example, the blank 24 may comprise natural and/or synthetic reinforcing fibers, such as chopped fiberglass, wood fibers, and/or other fibers, combined with resin or plastic, such as polypropylene powder or polyethylene. Furthermore, such materials may, for example, be heated and pressed between rollers to form the blank 24. In one embodiment, the blank 24 comprises AZDEL™, which is a sheet of chopped fiberglass mixed with polypropylene powder, and is available from General Electric Company of Southfield, Mich.

Next, the blank 24 is transferred to the forming station 16. In the embodiment shown in FIG. 1, the forming station 16 includes a compression mold 28 having first and second mold portions 30 and 32, respectively. The mold portions 30 and 32 may be mounted, for example, on platens (not shown) of a press (not shown) that is operable to move the mold portions 30 and 32 toward and away from each other. One or both of the mold portions 30 and 32 may be heated in any suitable manner such that the mold 28 is capable of sufficiently heating the blank 24. Alternatively or supplementally, the blank 24 may be heated, such as in an oven (not shown), prior to being transferred to the forming station 16.

The mold 28 is movable between an open position, shown in FIG. 1, and a closed position (not shown). In the embodiment shown in FIG. 1, each mold portion 30 and 32 has a non-planar, contoured mold surface. For example, each mold surface may have at least one curved section or bent section. Alternatively, one or both of the mold portions 30 and 32 may have a flat or planar mold surface. When the mold 28 is in the closed position, the mold surfaces cooperate with each other to mold or form the blank 24 into a desired shape or contour. This forming step may be performed such that the resultant shape of the formed blank 24 corresponds to a desired final shape of the interior trim part 12. This forming step may also be performed such that the formed blank 24 is provided with a non-planar configuration.

Next, the formed blank 24 is transferred to the trimming station 18, where excess material may be trimmed from the formed blank 24. While the trimming station 18 may include any suitable cutting apparatus for trimming the formed blank 24, in the embodiment shown in FIG. 1, the trimming station 18 includes one or more water jets 34. Alternative cutting apparatuses include, for example, knives and laser cutters.

Figure 2:
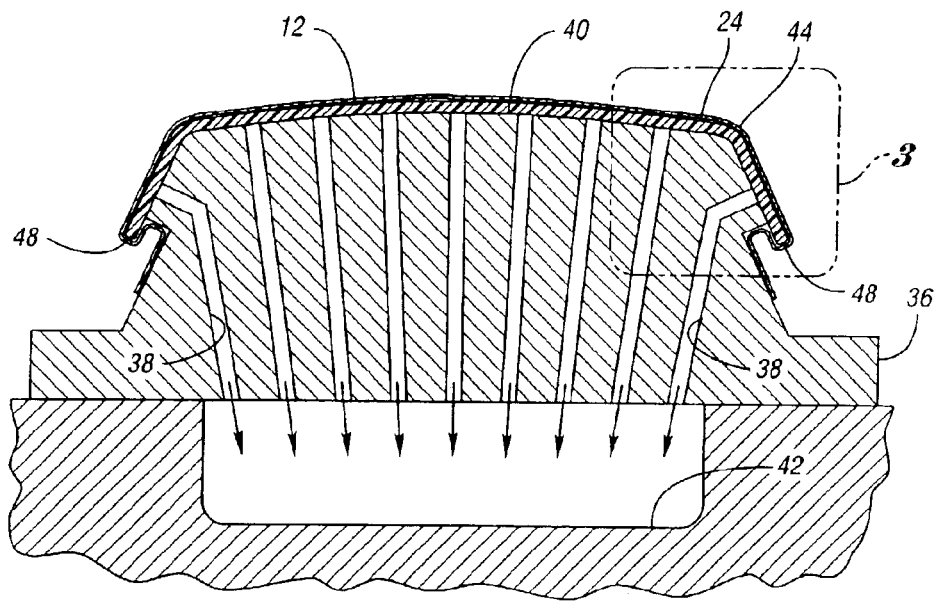
FIG. 2 is a schematic view of the vacuum mold in an activated state.

The formed blank 24 is then transferred to the cover application station 22, where the formed blank 24 is positioned on vacuum mold 36. Referring to FIG. 2, vacuum mold 36 includes one or more vacuum passages 38 that extend between mold surface 40 and a vacuum chamber 42. The vacuum chamber 42 is in fluid communication with a vacuum source (not shown) that is operative to draw air from the mold surface 40 through the vacuum passages 38.

Figure 3:
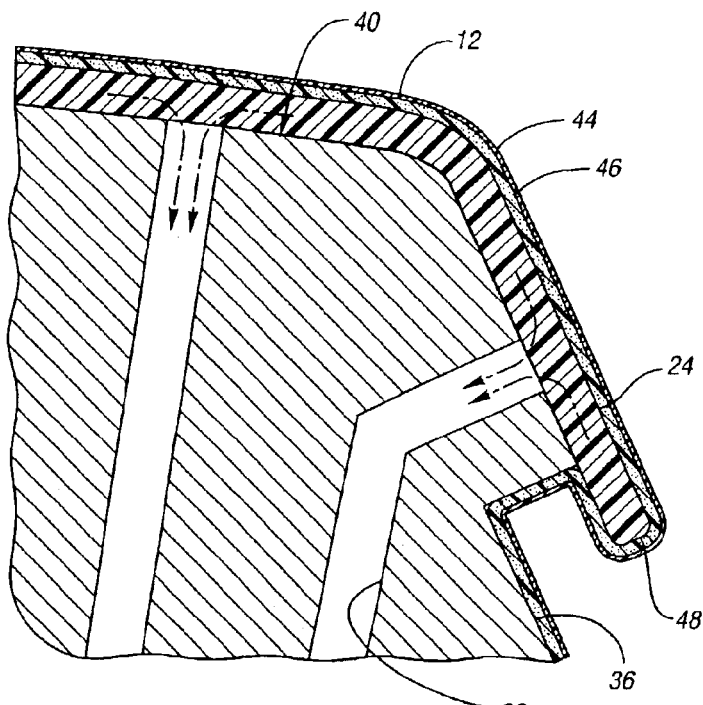
FIG. 3 is an enlarged portion of FIG. 2.

Referring to FIGS. 1 through 3, a cover material 44 is also positioned on the vacuum mold 36 and over the formed blank 24. The cover material 44 may comprise any suitable material, such as a vinyl, thermoplastic olefin, or thermoplastic urethane skin. Furthermore, the cover material 44 may be provided with or without a foam backing. Alternatively, a separate foam layer 46 may be positioned between the cover material 44 and the formed blank 24. The cover material 44 may also include an adhesive material. Alternatively or supplementally, one or more adhesive layers, such as adhesive films, may be positioned between the cover material 44 and the formed blank 24. For example, one adhesive film may be positioned between the cover material 44 and the foam layer 46, and another adhesive film may be positioned between the foam layer 46 and the formed blank 24.

The cover material 44, the foam layer 46 and/or the adhesive films may be heated, such as in an oven (not shown), prior to positioning these components on the formed blank 24. Alternatively or supplementally, the cover material 44, the foam layer 46 and/or the adhesive films may be heated, such as with infrared heaters (not shown), after these components are positioned on the formed blank 24.

Next, referring to FIGS. 2 and 3, the vacuum source (not shown) is activated to vacuum form the cover material 44 over the formed blank 24. More specifically, the vacuum source is activated to draw air through the formed blank 24 so as to draw the cover material 44, the foam layer 46 and the adhesive films against the formed blank 24 and bond these components to the formed blank 24. The cover material 44, foam layer 46 and/or adhesive films are preferably sufficiently air-impermeable so that these components are drawn tight against the formed blank 24.

Because the formed blank 24 is air-permeable, the presence of air bubbles between the cover material 44 and the formed blank 24 may be significantly reduced or eliminated. Furthermore, because of the air-permeable configuration, air may be drawn uniformly through the entire formed blank 24, including peripheral or end edges 48 of the formed blank 24, using one or more vacuum passages 38. As a result, the cover material 44 is able to wrap around end edges 48 of the formed blank 24 upon activation of the vacuum source. In the embodiment shown in FIGS. 2 and 3, the cover material 44 is able to wrap around the front, side and back of each end edge 48. Consequently, subsequent operations are not needed to wrap the cover material 44 around the end edges 48. Similarly, if the formed blank 24 includes interior edges, not shown, then the vacuum forming step may be performed such that the cover material 44 wraps around front, side and back portions of such interior edges. A secondary trimming operation may also be performed, if desired, to remove excess cover material 44 from the finished interior trim part 12.

Because the cover material 44 is attached to the blank 24 after the blank 24 has been formed into a desired shape, prominent features such as deep draws and/or sharp angles may be formed in the blank 24, using the mold 28 or other apparatus, without risk of tearing the cover material 44. Moreover, because the shape of the formed blank 24 may correspond to the final shape of the interior trim part 12, no additional shaping of the formed blank 24 may occur at the cover application station 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a vehicle interior trim part, the method comprising:

forming an air-permeable substrate into a desired shape;

positioning the formed substrate and a cover material on a vacuum mold such that the substrate extends between the cover material and the mold; and vacuum forming the cover material over the substrate such that the cover material wraps around the edge of the substrate;

wherein the substrate is configured to allow air to pass uniformly therethrough during the vacuum forming step, and wherein the vacuum forming step is performed such that air is drawn through the edge of the substrate to thereby draw the cover material toward front, side and back portions of the edge.

2. The method of claim 1 wherein the forming step comprises compression molding the substrate.

3. The method of claim 1 wherein the substrate comprises fiberglass and plastic.

4. The method of claim 1 wherein the substrate comprises reinforcing fibers.

5. The method of claim 1 wherein the substrate comprises plastic.

6. The method of claim 1 further comprising positioning an adhesive layer between the substrate and the cover material prior to the vacuum forming step.

7. The method of claim 1 further comprising positioning a foam layer between the substrate and the cover material prior to the vacuum forming step.

8. The method of claim 1 wherein the forming step is performed such that the shape of the substrate corresponds to a desired final shape of the interior trim part.

9. The method of claim 1 wherein the forming step results in the substrate having a non-planar configuration.

10. The method of claim 1 wherein no additional shaping of the substrate occurs during the vacuum forming step.

11. A method of making a vehicle door panel, the method comprising:

compression molding a porous substrate comprising fiberglass and polypropylene, such that the substrate has a non-planar configuration;

positioning the molded substrate and a cover material on a vacuum mold such that the substrate extends between the cover material and the mold; and vacuum forming the cover material over the substrate such that the cover material wraps around an edge of the substrate;

wherein the vacuum forming step is performed such that air is drawn through the edge of the substrate to thereby draw the cover material toward front, side and back portions of the edge.

12. The method of claim 1 wherein the substrate comprises a porous, fibrous material.

13. A method of making a vehicle interior trim part, the method comprising:

positioning a substrate comprising a porous air-permeable material in a compression mold;

compression molding the substrate into a desired shape;

positioning the molded substrate and a cover material on a vacuum mold such that the substrate extends between the cover material and the mold; and vacuum forming the cover material over the substrate, by drawing air through the substrate, to draw the cover material toward the substrate such that the cover material wraps around an edge of the substrate;

wherein the substrate is configured to allow air to pass uniformly therethrough during the vacuum forming step and wherein the vacuum forming step is performed such that air is drawn through the edge of the substrate to thereby draw the cover material toward front, side and back portions of the edge.

14. A method of making a vehicle interior trim part, the method comprising:

forming an air-permeable substrate into a desired shape;

positioning the formed substrate and a cover material on a vacuum mold such that the substrate extends between the cover material and the mold; and vacuum forming the cover material over the substrate such that the cover material wraps around an edge of the substrate;

wherein the vacuum forming step is performed such that air is drawn through the edge of the substrate to thereby draw the cover material toward front, side and back portions of the edge.

\* \* \* \* \*